UNITED STATES PATENT OFFICE.

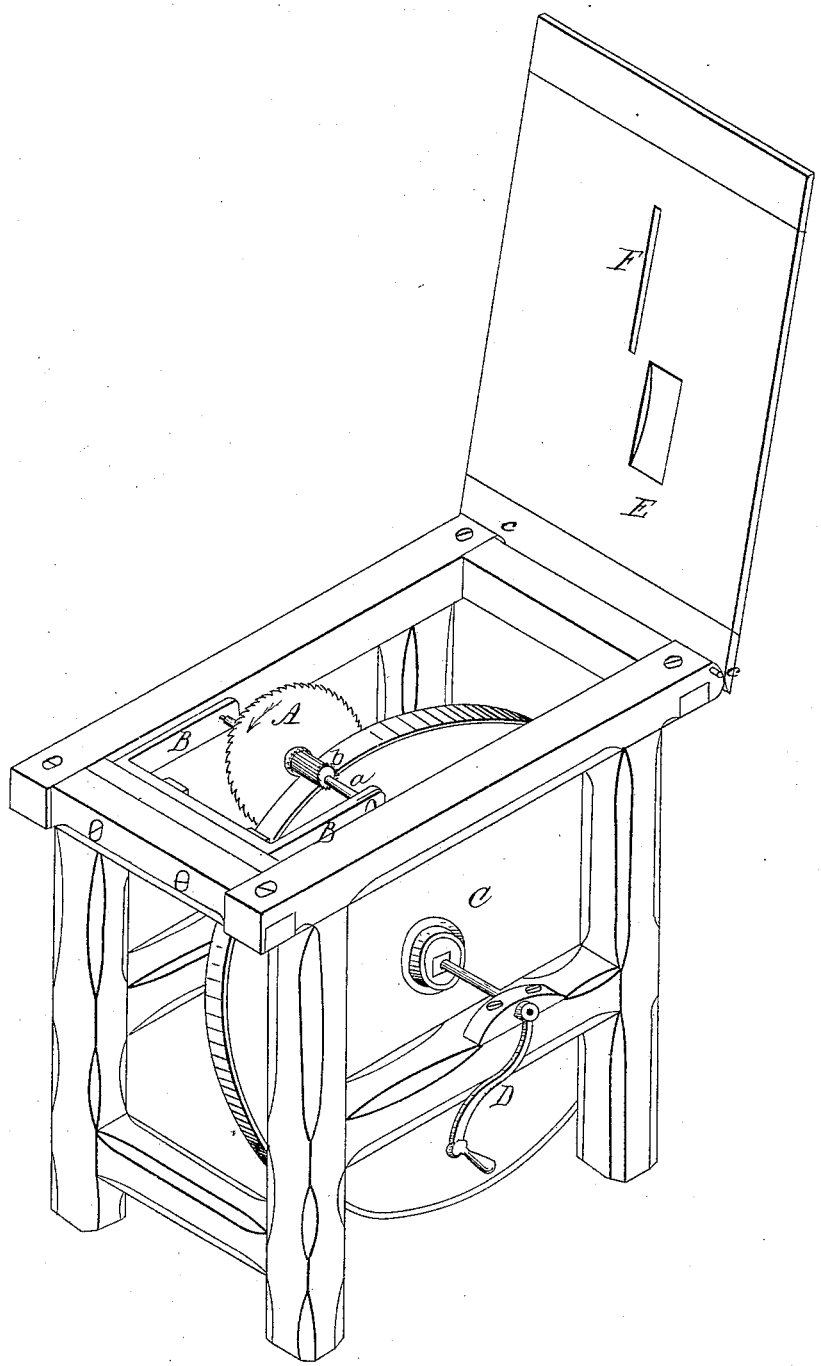

GEO. COOK AND DAVID COOK, OF NEW HAVEN, CONNECTICUT.

DRIVING CIRCULAR SAWS, &c.

Specification of Letters Patent No. 9,544, dated January 18, 1853.

*To all whom it may concern:*

Be it known that we, GEORGE COOK and DAVID COOK, both of the city and county of New Haven and State of Connecticut, have invented a new and useful Improvement in Working Circular Saws, &c.; and we do hereby declare that the following is a full, clear, and exact description of the construction and operation of the same, reference being had to the annexed drawing, forming part of this specification, which represents a perspective view of the saw with our improved driving apparatus attached.

It is well known that rotary motion has been communicated to shafts by causing a periphery, covered by some elastic substance, to revolve in contact with pulleys, or equivalents, on the shafts. Various devices have been used to increase the friction or adhesion of the surfaces in contact, such as corrugating the surface of the pulley or drum on the shaft; cutting its surface into straight teeth.

My improvement consists in making the teeth of the pulley on the shaft hollowing, or curved, on that side opposite to the direction in which it revolves, so that the elastic covering of the driving surface shall fill (by compression) said hollows, so that the teeth cannot slip, or spring out of contact, until the pinion or pulley separates entirely from the driving surface by virtue of its revolution. The straight and round tooth pinions have comparatively very slight hold upon the elastic driving surface, and as the pressure or resistance is increased, the more likely they are to slip, giving irregular and almost ineffective motion to the shaft, whereas the hooked or hollow tooth will adhere or cling more securely to the driving surface as the resistance or pressure is increased, giving a steady uniform motion.

In the drawings A represents the circular saw, upon the shaft $a$, which runs upon bearings in the frame B.

C is the driving wheel, having its periphery covered with india rubber or other elastic substance, into which meshes the hooked pinion $b$ upon the shaft $a$.

The operation of our combination is as follows:—The curved or hooked leaves of the pinion $b$ mesh into the rubber covering, and when resistance is applied to the saw and power to the crank, the rubber crowds into and fills the hollow of the tooth by reason of its elasticity and acts as a cog during the time the tooth is in contact with the rubber, and producing a rotary motion in the shaft sufficiently rapid for operating the saw A. This effect is due entirely to the peculiar hooked shape of the leaves or teeth of the pinion $b$, allowing the rubber to be crowded into them, so that it can exert its force in giving motion to the pinion without slipping. Straight teeth could not have the same effect, for although they might mesh into the rubber, it would slip out, not driving the pinion effectively, as it does in our teeth. If the resistance to the saw be small, the rubber will not pack as tightly in the cavity of the tooth as it would were the resistance increased, and the amount of power to be applied will consequently be less than in the latter case, which shows that the resistance to be overcome will regulate the application of power. In this respect the combination is decidedly self adjusting, a slight compression of the rubber serving to overcome a small resistance, which compression and packing of the elastic covering increases in proportion to the increase of the resistance.

What we claim and desire to secure by Letters Patent is—

The curved or hooked tooth pinion, acting in the manner and for the purposes hereinbefore set forth.

GEO. COOK.
DAVID COOK.

Witnesses:
S. RANSOM,
R. FITZGERALD.